April 14, 1936.　　　F. A. PARSONS　　　2,037,263
TRANSMISSION
Filed June 26, 1930　　　4 Sheets-Sheet 4
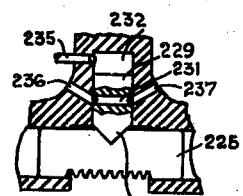
Fig. 17
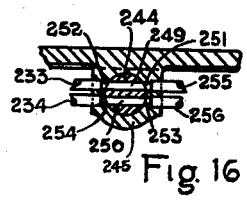
Fig. 16
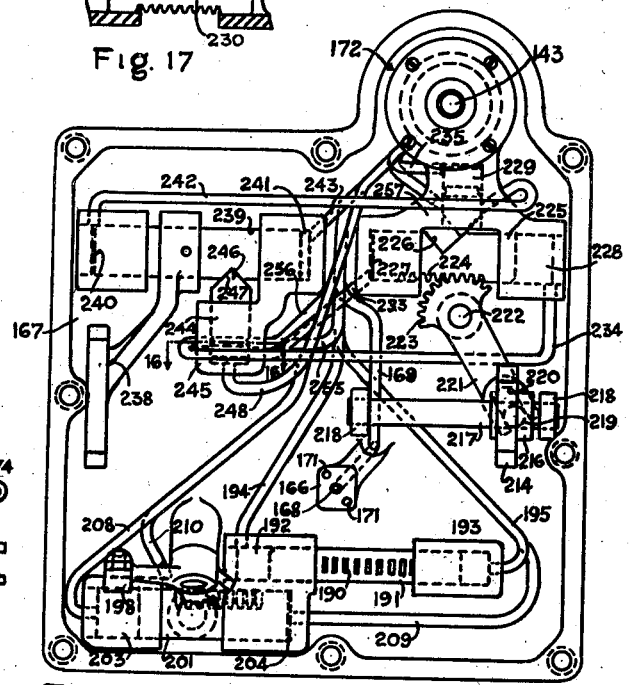
Fig. 7
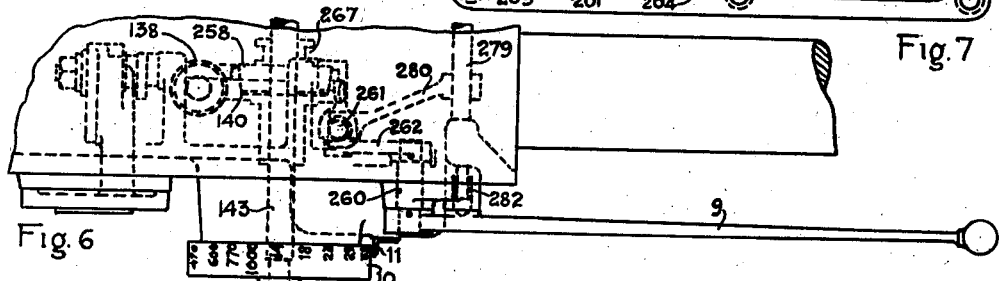
Fig. 8
Fig. 6
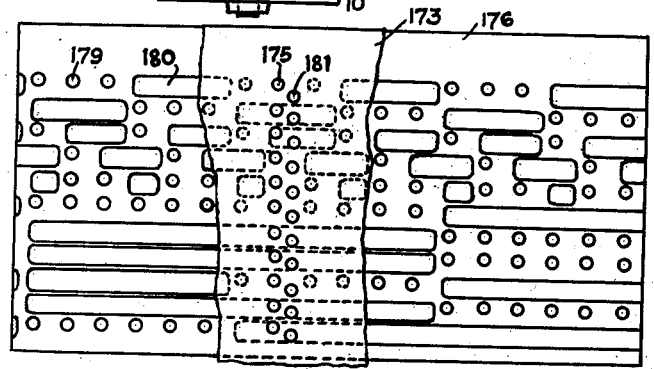
Fig. 11
INVENTOR
Fred A. Parsons Patented Apr. 14, 1936

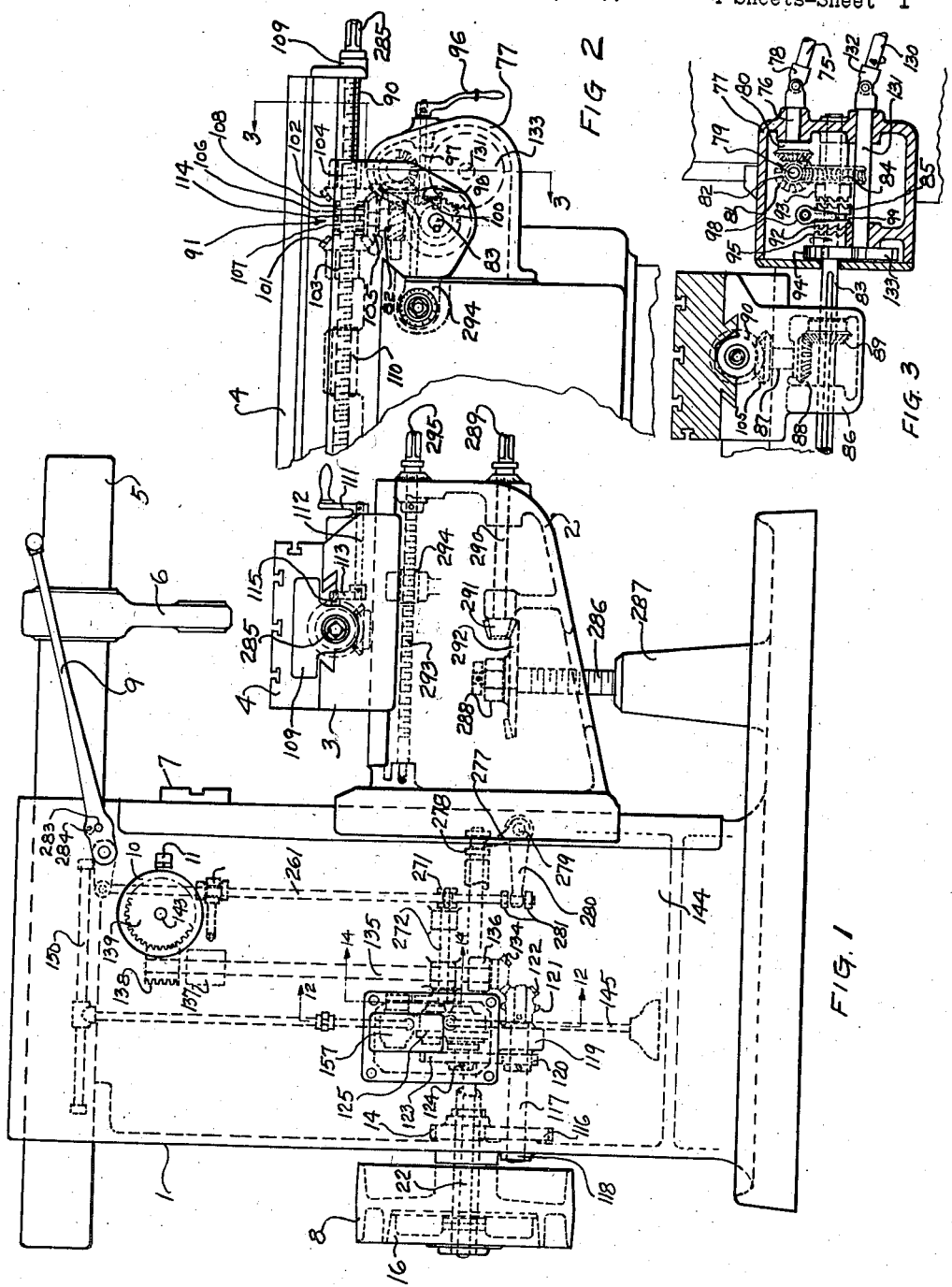

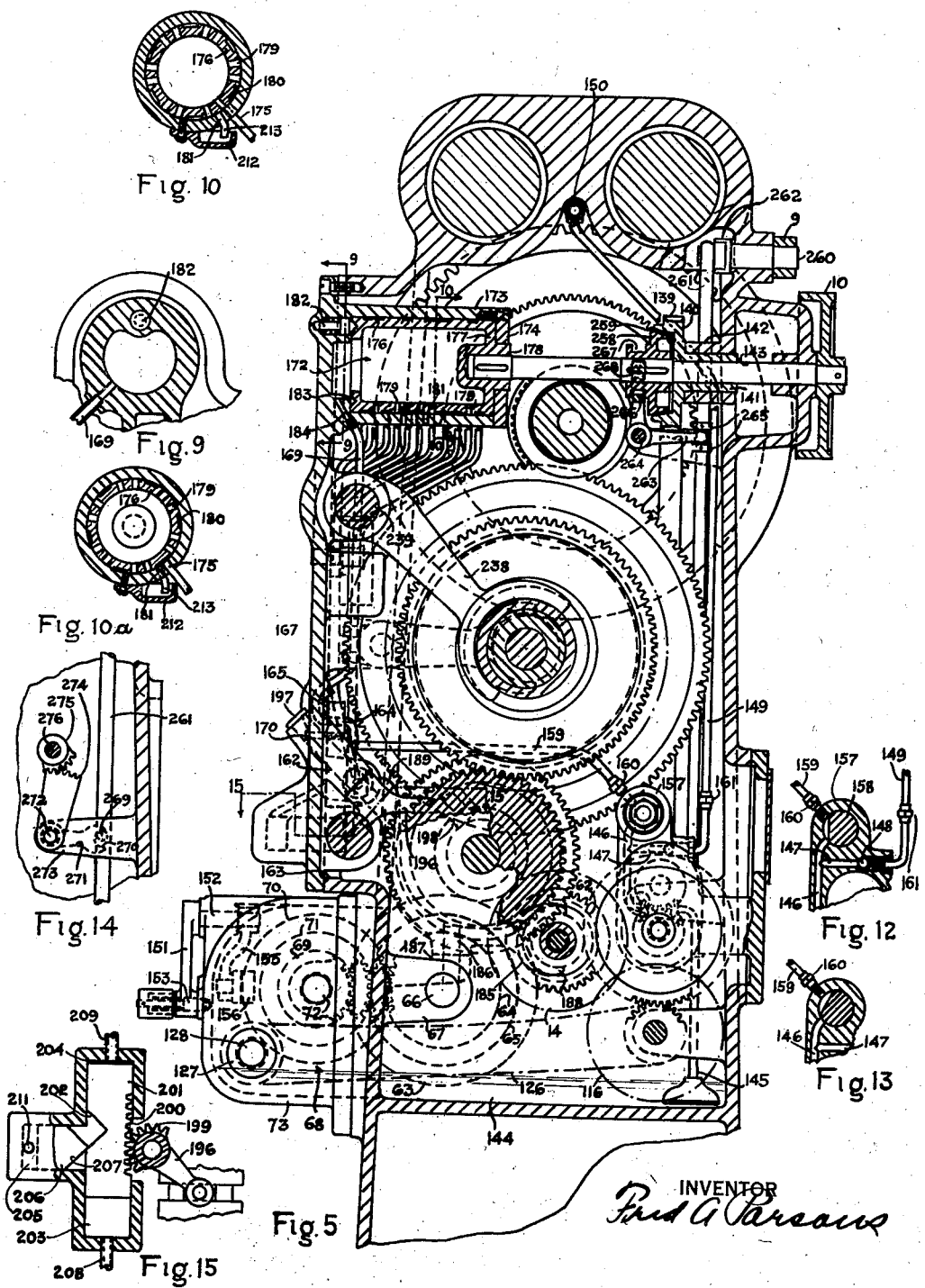

2,037,263

UNITED STATES PATENT OFFICE 2,037,263

TRANSMISSION

Fred A. Parsons, Milwaukee, Wis., assignor to Kearney & Trecker Corporation, West Allis, Wis.

Application June 26, 1930, Serial No. 463,975

2 Claims. (Cl. 90—21)

This invention relates to improvements in machine tools and more particularly to an improved mechanism for shifting the speed change gearing of machine tools.

An object of the invention is to secure greater convenience of operation in shifting the gearing of a machine tool.

A further object is to provide means adapted to minimize the chances of error in performing such shifting.

A further object is to provide means for performing such shifting requiring a minimum of effort in their operation.

Another object is to provide a device for effecting such shifting by the manipulation of a single lever.

A further object is to provide such a device having an improved speed selector adjustable in advance of the shifting operation.

A further object is to provide such a device in which the speeds to be selected are arranged in numerical order on a chart or index.

Another object is to provide improved means for adjusting the speed selector operated by power.

A further object is to provide such a device involving extreme simplicity.

A further object is to provide such a device adapted to be operated by hydraulic pressure.

A further object is to provide such a device adapted to utilize a source of hydraulic pressure normally found in a machine of this character.

A further object is to provide a machine in which substantially the entire control is centered in a single lever.

Another object is to generally simplify and improve the construction and operation of machines of this type, and other objects and advantages will appear as the specification proceeds.

The invention consists in the construction and combination of parts as herein illustrated, described and claimed, and in such modification of the structure illustrated and described as may be equivalent to the claims.

In the drawings:

Fig. 1 is a left side elevation of a milling machine incorporating the invention.

Fig. 2 is a front elevation of a portion of the machine.

Fig. 3 is a sectional view on the line 3—3 of Fig. 2.

Fig. 5 is a vertical section taken along the line 5—5 of Fig. 4.

Fig. 6 is a plan view of a portion of the machine.

Fig. 7 is an elevation of a portion of the machine showing the hydraulic means for actuating the shifting forks.

Fig. 8 is an elevation of a housing shown attached to the machine in Figs. 4 and 5.

Fig. 9 is a transverse section taken along the line 9—9 of Fig. 5.

Figs. 10, 10a are views in section taken along the line 10—10 of Fig. 5 showing the parts in different positions.

Fig. 11 is an enlarged developed view of members shown in section in Figs. 5, 10, and 10a, showing the relations of certain parts to each other.

Fig. 12 is a partial sectional view on the line 12—12 of Fig. 1 showing a control valve.

Fig. 13 is a similar section showing the valve in another position.

Fig. 14 is a section on the line 14—14 of Fig. 1 showing a detail of a valve operating mechanism.

Fig. 15 is a development in part section on the line 15—15 of Fig. 5.

Fig. 16 is a section on the line 16—16 of Fig. 7.

Fig. 17 is a sectional view of certain parts indicated in Fig. 7.

Similar reference numerals refer to like parts throughout the drawings and specification.

Figure 4:
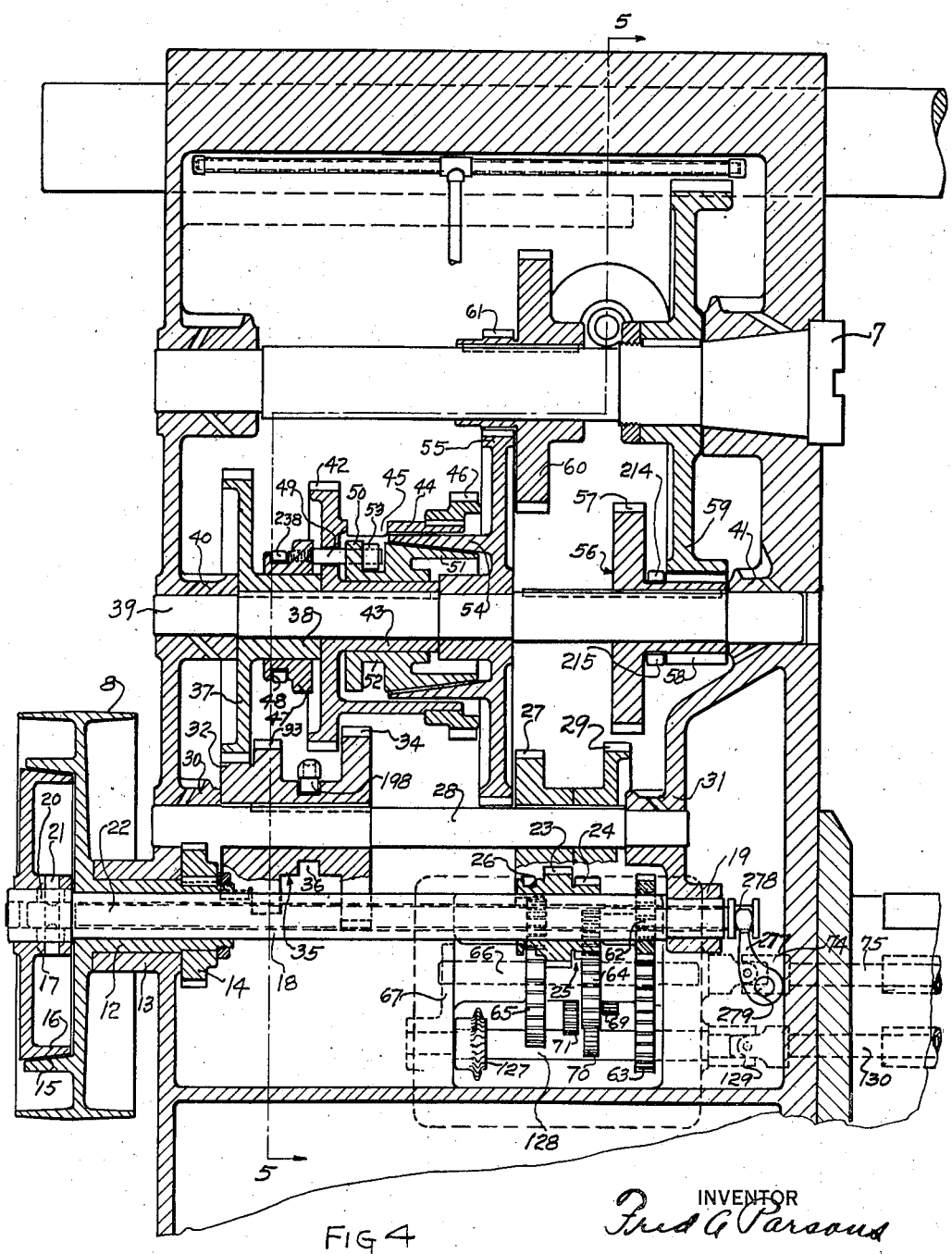
Fig. 4 is a vertical sectional view of a part of the machine showing the speed changing elements.

For convenience of illustration the invention is shown incorporated in a milling machine of the type having a hollow column 1, a knee 2, slidable on one face of the column, a saddle 3, horizontally adjustable on the knee, and a reciprocable table 4, slidable on the saddle. The machine also has overarms 5 slidably adjustable in the upper extremity of the column, and a pendant 6 slidable on the overarms. A tool spindle 7 is journaled in the column and is driven by a pulley 8 through speed changing mechanism to be presently described. A lever 9 is provided for selecting and obtaining the various speeds and a dial 10 and pointer 11 serve to indicate the speeds selected.

As shown in Figs. 4 and 5, the spindle is driven mechanically through a train of gears as follows: Pulley 8 is driven by a belt, not shown, and has an elongated hub or sleeve 12 journaled in a suitable bearing 13 in a wall of the column 1 and having a gear 14 fixed on its inner end. The pulley also has an annular internal surface 15 for engaging a clutch member 16. Clutch member 16 has a hub 17 which is slidably fitted on a sleeve 18 journaled at one end in a bore in sleeve 12, and at its other end in a bearing 19 formed in column 1. Sleeve 18 has slots 20 for the passage of a pin 21 which is rigidly secured in the hub 17 and also in a clutch actuating shaft 22 which is mounted for longitudinal movement in the bore of sleeve 18. Means are provided for so moving shaft 22, as will be fully described below.

It will be apparent that when shaft 22 is moved to the left in Fig. 4, member 16 will be moved to the left, through the connection of pin 21 with hub 17, and will not engage surface 15. Pulley 8 will accordingly rotate freely on sleeve 18 and without driving the same. When, however, shaft 22 is moved to the right in Fig. 4, member 16 will be moved into engagement with surface 15 and will rotate with pulley 8. The resulting rotation will be imparted to sleeve 18 by the engagement of pin 21 with slots 20.

Sleeve 18 has gears 23 and 24 integrally or otherwise connected with each other to form a unitary member 25 slidably keyed on sleeve 18. An annular groove 26 is provided for effecting movement of said member. Gear 23 is adapted in one position of the unit to mesh with a gear 27 fixed with a shaft 28 and gear 24 is adapted in another position of unit 25 to mesh with a gear 29 also keyed on shaft 28. Shaft 28 is journaled in suitable bearings 30 and 31 in column 1. Triple gears 32, 33, 34 are slidably keyed on shaft 28 and connected together integrally or otherwise to form a unitary member 35. A groove 36 is formed in the member to effect sliding movement thereof.

Gear 32, in one position of member 35, is adapted to mesh with and drive a gear 37 having a hub 38 rigidly keyed on a shaft 39. Shaft 39 is journaled in bearings 40 and 41 in the column 1. A gear 42 is also rigidly keyed on shaft 39 in position to engage gear 33 in one of the positions of adjustment of member 35. Gear 42 has an elongated hub 43 extending from one side thereof and a sleeve or drum 44 having openings 45, and fixed on its end remote from gear 42 a gear 46. Gear 46 is positioned to engage, in still another position of member 35, gear 34. A spool 47 is slidably mounted on the hub 38 and has a groove 48 formed in its periphery. Said spool has threaded therein a plurality of bolts 49 which are slidably fitted in suitable openings in gear 42. Bolts 49 engage at their ends remote from spool 47 a flange portion 50 of a clutch member 51 slidably mounted on the hub portion 43 of gear 42. Clutch member 51 has a groove 52 into which the ends of the bolts 49 project and nuts 53 are provided threaded on bolts 49 for adjusting the distance between spool 47 and clutch 51. The nuts may be reached for adjustment through openings 45. Clutch 51 when moved to the right in Fig. 4 by means of spool 47 and bolts 49 engages a sleeve portion 54 of a gear 55 journaled on shaft 39. Sleeve 54 enters sleeve 44, but without engaging therewith. A member 56 is slidably keyed on shaft 39 and has formed thereon gears 57 and 58. Gear 58 is adapted in one position of member 56 to engage a gear 59 rigidly mounted on the spindle 7 and gear 57 in another position of member 56 is adapted to engage a gear 60 also rigidly mounted on spindle 7. A gear 61 is rigidly mounted on spindle 7 and adapted to be driven by gear 55 at such times as the latter is clutched to shaft 39 by clutch member 51. The above described mechanism is adapted for changing the rate of spindle rotation, as will now be described.

Sleeve 18 is in driving relationship with shaft 28 either through gears 23 and 27, or through gears 24 and 29. With pulley 8 rotating at a constant speed, it will accordingly be possible to cause rotation of shaft 28, upon engagement of clutch 16, at two different speeds, according to which of the above gear pairs are in engagement. The spacing of gears 27 and 29 renders impossible the engagement of more than one pair of gears at a time. Shaft 28 may be caused to drive shaft 39 through any one of the three different gear pairs 32, 37; 33, 42; and 34, 46 according to the position of adjustment of member 35. Shaft 39 will accordingly have six possible speeds, three for each of the two of shaft 28. It will be understood that shaft 39 is free to turn in gear 55 at all times when clutch 51 is out of engagement with sleeve 54. Under these conditions shaft 39 may drive spindle 7 either through gears 58 and 59, or through gears 57 and 60 according to the position of member 56. Member 56 may be moved to a neutral position in which it will engage neither of gears 59 nor 60, and at such times clutch 51 may be engaged with sleeve 54, thereby fixing gear 55 to shaft 39 and driving spindle 7 through gear 61. The spindle may accordingly be driven from shaft 39 at any one of three different speeds for each of the six possible speeds of shaft 39 and will accordingly have a total of eighteen possible speeds relative to the pulley 8.

Mechanism is provided for shifting the various members of the train and insuring the neutral position of gear member 56 before engagement of clutch 51, as will be fully described presently.

A gear 62 is mounted on sleeve 18 and drives a gear 63 constituting part of a feed train. Gears 64 and 65 are connected with gear 63, integrally or otherwise, and journaled on a shaft 66 fixed to a bracket portion 67 of the column 1. These gears are adapted to cooperate with a member 68, Fig. 5, comprising gears 69, 70, and 71, slidably fixed on shaft 72 journaled in suitable bearings in a feed box 73 fixed to the column 1. In one position of member 68, gear 69 engages gear 63. In another position gear 70 engages gear 64, and in another position gear 71 engages gear 65. These three combinations result in three different speeds for shaft 72, as will be understood. Shaft 72 extends outside of the feed box and has on its projecting end a universal joint 74, Fig. 4, adapted to connect shaft 72 with an extensible feed drive shaft 75.

Shaft 75 drives a shaft 76 journaled in a casing 77, Figs. 2 and 3, fixed with knee 2 through the medium of a universal joint 78. Shaft 76 drives a worm shaft 79 through bevel gears 80 and 81 fixed with the respective shafts, and a worm 82 fixed with shaft 79 drives a shaft 83 through a worm wheel 84 journaled thereon and capable of being fixed therewith by means of a clutch generally denoted by numeral 85. Shaft 83 is journaled in casing 77 and in a housing 86 fixed with saddle 3 and movable therewith, and drives a vertical shaft 87 by means of a bevel gear 88 fixed therewith and engaging a bevel gear 89 slidably keyed to shaft 83, and vertical shaft 87 drives a table screw 90 through a reverser generally denoted by numeral 91, Fig. 2.

Clutch 85 comprises a member 92, Fig. 3, slidably keyed on shaft 83 and having suitable clutch teeth for engagement, when moved to the right in Fig. 3, with clutch teeth 93 formed on worm wheel 84, and having a suitable clutch portion for engagement, when moved to the left in Fig. 3, with a gear 94 journaled on shaft 83, and having a clutch portion 95. Worm wheel 84 and gear 94 are spaced apart sufficiently so that clutch member 92 may be placed in a neutral position between them, whereby table 4 will not be driven.

Clutch member 92 may be moved by means of a hand lever 96, Fig. 2, fixed with a shaft 97 journaled in casing 77 and having a lever 98 fixed therewith engaging a suitable groove 99, Fig. 3, in clutch member 92 by means of a pivoted shoe 100, Fig. 2.

Reverser 91 comprises bevel gears 101, 102 having hub portions 103, 104 respectively, journaled in bracket portions fixed with saddle 3. Hub portions 103, 104 have suitable bores through which slides table screw 90, and gears 101, 102 are spaced apart and driven in opposite directions from vertical shaft 87 by means of a bevel gear 105 fixed therewith. A clutch member 106 is slidably keyed on table screw 90 between gears 101, 102 and may be clutched with one or the other by means of clutch teeth 107 and 108 formed on the clutch member and engageable with suitable clutch teeth formed on gears 101, 102. Thus when clutch member 106 is engaged with gear 101, table screw 90 will be rotated in one direction and when clutch member 106 is engaged with gear 102, table screw 90 will be rotated in the opposite direction, the spacing of gears 101, 102 being such that it is impossible to engage clutch member 106 with both gears at the same time. Rotation of table screw 90 causes sliding movement of table 4, screw 90 being prevented from axially moving relative to table 4 by bearings 109—109 fixed with table 4, and engaging a nut portion 110 fixed with saddle 3.

Means are provided for shifting clutch member 106 comprising a hand lever 111 fixed on a shaft 112 journaled in suitable bearings in saddle 3 and having a lever 113 fixed therewith and engaging a groove 114 in clutch member 106 by means of a pivoted shoe 115.

An independent power train is provided for driving the fluid pump and rapid traverse as follows: Gear 14, Figs. 1, 4, and 5, drives a gear 116 fixed on a shaft 117 journaled in bearings 118 and 119. Shaft 117 has a gear 120 thereon, a sprocket 121 and bevel gear 122. Gear 120 is in driving relation with a gear 123 which is fixed on the drive shaft 124 of a lubricant pump 125. Sprocket 121 is connected by a chain 126, Fig. 5, to a sprocket 127 located in feed box 73 and fixed on a shaft 128 journaled in suitable bearings therein. Shaft 128 projects outside of the feed box and has a universal joint 129, Fig. 4, adapted to connect it with an extensible drive shaft 130. Drive shaft 130 actuates a shaft 131 journaled in casing 77, Fig. 3, through a universal joint 132 and shaft 131 drives gear 94 through a gear 133 meshing therewith and fixed with shaft 131.

Bevel gear 122 meshes with a bevel gear 134, Fig. 1, fixed on a shaft 135 extending upwardly in column 1 and journaled in suitable bearings 136 and 137 therein. Shaft 135 has at its upper end a worm 138 adapted to drive a worm wheel 139 formed as a part of a clutch element 140, Fig. 5, provided with an elongated hub portion 141 journaled in a bearing 142 in column 1. A shaft 143 is journaled in a suitable bore in the hub 141 for cooperation with the speed selecting mechanism, to be described presently.

The last described mechanism operates independently of the position of clutch 16, as will be understood from a consideration of Figs. 1 and 4. Pulley 8 is integrally connected with sleeve 12 and gear 14 is fixed on said sleeve, as above described. It follows that gear 14 runs whenever pulley 8 is driven and accordingly shaft 117, pump shaft 124, rapid traverse shaft 128, selector drive shaft 135, and clutch element 140 all operate whenever pulley 8 is driven, regardless of the position of clutch member 16.

The pump 125 serves the double purpose of supplying lubricant to the various parts of the machine and of supplying pressure fluid to the shifting mechanism. Pump 125 draws fluid from the reservoir 144 formed in the base of the machine through a suction pipe 145 and forces it into a discharge port 146, Figs. 5 and 12. A branch duct 147 leads to a pressure responsive ball valve 148 and a pipe 149 leads from said valve to a perforated header 150 located in an upper part of column 1. Accordingly, whenever sufficient pressure is built up in port 146, ball valve 148 opens and allows fluid to pass through pipe 149 to header 150. The fluid sprays from header 150 down over the gears and bearings in the column, finally returning to reservoir 144. The valve 148 provides for this fluid flow, but insures a sufficient pressure being maintained in port 146 for actuation of the shifting mechanism.

In order to simplify the description of this invention, the feed change gears in the disclosed machine are shown as mechanically shifted, although it is apparent that they may also be shifted by the means of mechanism similar to the improved shifter shown for the spindle rate changer. A handle 151, Fig. 5, is mounted on a shaft 152 journaled in a wall of the feed box and capable of swinging movement adjacent the outside wall of the box. A spring pressed pin 153 is slidably held in the handle and holes 154—154, Fig. 8, are provided in the wall of the box for reception thereof. Shaft 152 has fixed on its inner end a shifter arm 155, Fig. 5, provided with a pivoted shoe 156 formed to engage the sides of gear 70. Movement of handle 151 will accordingly cause, through shaft 152, arm 155 and shoe 156, shifting movement of gears 69, 70, and 71; and engagement of pin 153 with one or another of holes 154 will maintain the parts in shifted position, as will be understood. The shiftable elements of the spindle drive train are controlled by hydraulic means as follows:

Port 146, at its upper end leads into the casing 157 of a valve 158 which, in the position shown in Fig. 12, provides communication with a pipe 159, suitable couplings 160, 161 being provided to facilitate removal of the pump, and in the position shown in Fig. 13 prevents such communication. Pipe 159 leads from valve 158 to an arm 162 formed as a part of column 1 and rising from the lower edge 163 of an opening therein. Arm 162 has a port 164 communicating with pipe 159 and a face 165 adapted to cooperate with a pad 166, Fig. 7, formed on a cover plate 167 which is adapted to be bolted in position over the opening. A port 168 is formed in pad 166 and adapted to register with port 164 in arm 162 when cover plate 167 is in position. Port 168 communicates with a pipe 169 which leads to a hydraulic shifting mechanism. Arm 162 and pad 166 constitute a convenient means for automatically connecting the piping of the column with that of cover plate 167 whenever the latter is placed in position on the column. Bolts 170—170 may be fitted in bores 171—171 and may engage arm 162 to prevent springing thereof away from pad 166 under the influence of the hydraulic pressure.

The hydraulic shifting mechanism includes a speed selector denoted generally by reference numeral 172 comprising a substantially cylindrical casing 173, Figs. 5, 7, 10, and 10a, fixed with plate 167 and having a head 174 on its inner end. A plurality of ports 175—175 are formed in the wall of casing 173 and a sleeve 176 is rotatably fitted in casing 173 and has one end closed by a head portion 177. Sleeve 176 is connected with shaft 143 by means of a hub 178 formed as a part of head portion 177 and which is rotatably disposed in a suitable opening in head 174. A plurality of ports 179—179 peripherially spaced apart at a predetermined distance, and grooves or channels 180—180, Figs. 5, 10, 10a, and 11, are provided in the face of sleeve 176. Pipes lead from ports 175—175 to the various elements to be actuated by the hydraulic pressure and exhaust ports 181—181 are formed in casing 173 adjacent to the ports 175—175 spaced peripherially of the casing at a distance substantially less than the spacing of ports 179—179.

A spring pressed plunger 182 engages a series of depressions 183 formed in sleeve 176 and constitutes means for yieldably locking the sleeve in various positions of rotary adjustment. Ports 179—179 and channels 180—180 are arranged in a predetermined pattern so that for each specific position determined by plunger 182 certain of ports 179—179 will register with certain of ports 175—175 and the remainder of ports 175—175 will be connected through channels 180—180 with exhaust ports 181—181. Pipe 169 communicates with the interior of casing 173 through a port 184.

Accordingly, whenever valve 158 is in the position shown in Fig. 12, fluid will flow through pipes 159 and 169 to the interior of casing 173 and sleeve 176. It will then pass through whatever of ports 179—179 are in registry with any of ports 175—175 and through their respective pipes to the shifting apparatus. Fluid returning through other pipes to ports 175—175 in response to the shifting action will be conducted through certain of channels 180—180 to the adjacent exhaust ports and discharge into the interior of column 1.

No pressure fluid will escape from the interior of sleeve 176 through any of the exhaust ports because of the spacing of the same relative to the spacing of ports 181—181 whereby in any of the adjusted positions determined by plunger 182, the exhaust ports 181—181 will lie between and to one side of ports 179—179 and be closed by the imperforate wall of sleeve 176. Furthermore, each exhaust port is located in a plane between the planes of adjacent sets of ports 179—179, as shown in Fig. 11, whereby there will be no position in which any of ports 179—179 will register with any of exhaust ports 181—181. It will thus be seen that means are provided in the form of selector 172 for readily supplying pressure fluid to any desired combination of shifting devices and exhausting any fluid returning from any shifting devices as a result of shifting movement thereof, merely by causing rotation of sleeve 176 to the proper adjusted position.

As above described, the double gear member 25 has two positions for producing two speeds in shaft 28. For shifting this member a shifter fork 185, Fig. 5, is provided pivoted on a stud 186 fixed with a bracket portion 187 fixed with column 1, and having enlarged portions 188—188 engaging groove 26. The fork member at its opposite end is formed as a gear sector 189 and engages rack teeth 190, Fig. 7, formed on a plunger 191. Plunger 191 is fitted at its ends into cylinders 192 and 193 fixed with cover plate 167. Cylinder 192 has a pipe 194 connecting with one of ports 175 and cylinder 193 has a pipe 195 connecting with another of ports 175. Accordingly, when a spindle speed is desired which will necessitate the engagement of gear 23 with gear 27, the corresponding position of selector sleeve 176 will be such as to cause registration of one of ports 179 with the port 175 connected with pipe 194 and registration of a groove 180 with port 175 connected with pipe 195.

Thus when valve 158 is in the position shown in Fig. 12, fluid pressure will be transmitted through pipes 159 and 169 to selector 172 and from there through pipe 194 to cylinder 192, thus moving plunger 191 to the right. Fluid already in cylinder 193 will pass through pipe 195 and one of grooves 180 to one of the exhaust ports 181 and be discharged. Movement of plunger 191 to the right in Fig. 7 will through the pivoted shifter fork 185 cause movement of gear member 25 to the left in Fig. 4 and consequent engagement of gear 23 with gear 27. On the contrary, when a spindle speed is desired requiring the engagement of gear 24 with gear 29, sleeve 176 will be rotated to such a position that pressure will be transmitted in the above manner through pipe 195 to cylinder 193, while cylinder 192 will be connected through pipe 194 with an exhaust port 181. Plunger 191 will accordingly move to the left in Fig. 7 and cause movement of member 25 to the right in Fig. 4.

Triple gear 35, as described above, has three possible positions and thus requires a shifting device differing somewhat from the above as follows: A shifting arm 196, Fig. 5, is provided fixed on a shaft 197 journaled in a suitable bearing in cover plate 167 and having a pivoted shoe 198 engaging groove 36, Fig. 4. A gear segment 199 is formed on arm 196 and engages rack teeth 200 in a plunger 201, Figs. 5, 7, and 15. Plunger 201 has a V-shaped recess 202 in a side thereof and is reciprocably fitted in cylinders 203 and 204, fixed with cover plate 167. A third cylinder 205 is fixed with cover plate 167 and has a plunger 206 having a wedge-shaped end portion 207 cooperating with the recess 202 in plunger 201. A pipe 208 connects cylinder 203 with one of ports 175 of selector 172 and a pipe 209 connects cylinder 204 with another of ports 175 while a pipe 210, Fig. 7, connected with a port 211 leading from cylinder 205 leads to another of ports 175.

Thus when a spindle speed is selected which requires the engagement of gear 32 with gear 37, fluid will be directed into pipe 208 and cylinder 203 in the manner above described, while pipe 209 and cylinder 204 will be connected with one of exhaust ports 181. Pipe 210 will also be connected with an exhaust port and plunger 201 will be moved to the right in Fig. 7 causing shifting of gear member 35 to the left in Fig. 4. It will be apparent from a consideration of Fig. 15 that any movement of plunger 201 in either direction from its mid-position will cause movement of plunger 206 to the left in Fig. 15. Any fluid in cylinder 205 will under these conditions escape through port 211 and pipe 210 into one of exhaust ports 181. If the desired spindle speed calls for the engagement of gears 34 and 46, Fig. 4, fluid will be transmitted through pipe 209, Fig. 7, and exhausted through pipe 208 and plunger 201 will be moved to the left with resulting movement to the right in Fig. 4 of member 35.

Assuming the parts in the position shown in Figs. 4 and 7, when a spindle speed is selected requiring the engagement of gears 33 and 42, fluid pressure will be transmitted through pipe 210 to cylinder 205, while both pipes 208 and 209 will be put in communication with exhaust ports 181. Motion of plunger 206 to the right in Fig. 15 will accordingly take place and owing to the angularity of portion 207 and recess 202, plunger 201, arm 196, and gear member 35 will be shifted to their respective mid-positions and the desired gears engaged.

It is apparent that during this movement either cylinder 203 or 204 might draw air in through its exhaust port with disadvantageous results, and to guard against this there is provided a reservoir 212, Figs. 10 and 10a, designed to retain at all times a small quantity of the fluid exhausted from the various shifting devices, and to overflow when full. Short lengths of pipe 213 lead from exhaust ports 181 to points well below the surface of the fluid in the reservoir. Consequently whenever a negative state of pressure occurs in any cylinder connected with an exhaust port, it will draw fluid and not air into the system.

As outlined above, gear member 56 is susceptible of three positions, one in which gear 58 engages gear 59, and one in which gear 57 engages gear 60, and a third or neutral position in which the above gears 57 or 58 engage neither gear 59 or 60. For shifting member 56 there is provided a device including a shifter fork 214 engaging an annular groove 215 formed between gears 57 and 58, the fork having an apertured portion 216, Fig. 7, slidable on a guide rod 217 fixed in brackets 218—218 rigid with cover plate 176. A pin 219 is fixed on apertured portion 216 and engages a slot 220 formed in a pivoted arm 221. The arm is pivoted on a stud 222 fixed with cover plate 167 and has a gear sector 223 meshing with rack teeth 224 formed in a plunger 225. Plunger 225 has a V-shaped recess 226 and is reciprocably fitted in cylinders 227 and 228. A plunger 229 having a wedge-shaped end portion 230, Fig. 17, cooperating with the V-shaped recess 226 in plunger 225 and a port 231 therethrough is slidably fitted in a cylinder 232 disposed axially at right angles to cylinders 227 and 228. Cylinder 227 has a pipe 233 for supplying and exhausting fluid, and cylinder 228 has a pipe 234 for a similar purpose. Cylinder 232 has a pipe 235 for supplying and exhausting fluid in a similar manner.

Cylinder 232 has ports 236 and 237 in the wall thereof adapted to register with port 231 in plunger 229 under certain conditions, as shown in Fig. 17. It will be apparent that when fluid is admitted to cylinder 228 and exhausted from cylinders 227 and 232, plunger 225 will move to the left, as shown in Fig. 7, and gear 58 will be shifted into engagement with gear 59. At the same time plunger 229 will be forced upwardly owing to the angularity of portion 230 and recess 226. When, however, fluid is admitted to cylinder 232 and exhausted from cylinders 227 and 228, plunger 229 will be forced downwardly and, owing to the aforesaid angularity of portion 230 and recess 226, plunger 225 will be forced to take a central position and gear member 56 will be shifted to neutral.

When fluid is admitted to cylinder 227 and exhausted from cylinders 228 and 232, plunger 225 will be moved to the right and gear 57 will be shifted into engagement with gear 60. At the same time, owing to the angularity of portion 230 and recess 226, plunger 229 will be moved upwardly, as above described in the engagement of gears 58 and 59. The operation of this last described shifting device is so interrelated with that of the mechanism for shifting clutch 51 that it will be necessary to describe the latter mechanism before a full understanding can be had of the operation of the former.

Clutch 51, as above described, can be shifted into and out of engagement with sleeve 54 by means of spool 47 and bolts 49. A shifter fork 238 engages groove 48 of the spool and is fixed at its end remote therefrom on a plunger 239, Figs. 5 and 7, slidably fitted in cylinders 240 and 241, fixed on cover plate 167, and having fluid pipes 242 and 243 respectively. A plunger 244 is fitted in a cylinder 245 axially at right angles to plunger 239 and having a wedge-shaped end portion 246 cooperating with an angular recess 247 in said plunger. Cylinder 245 has a fluid pipe 248 leading to one of ports 175. It will be seen that when fluid is transmitted through pipe 242 to cylinder 240 and cylinders 241 and 245 are connected with the exhaust ports, plunger 239 will be moved to the right in Fig. 7 and plunger 244 will be forced downwardly.

The movement of plunger 239 will engage clutch 51 through fork 238. If now pressure is transmitted to cylinders 241 and 245 through pipes 243 and 248, plunger 239 will be moved to the left and plunger 244 will be raised. Plunger 244 has ports 249 and 250, therethrough adapted to register when the plunger is in its uppermost position with ports 251, 252, Fig. 16, and with ports 253, 254, respectively, of cylinder 245. A pipe 255 connects one of ports 175 of the selector with port 251 and another pipe 256 connects another of ports 175 with port 253. Pipe 233 connects with the port 252 and pipe 234 connects with port 254. Pipe 242 connects with port 237 of cylinder 232 and a pipe 257 connects the remaining port 175 with port 236.

As stated above, it is important that gear member 56 be shifted to its neutral position before clutch 51 is engaged and also that clutch 51 be disengaged before gear member 56 is shifted out of its neutral position. This sequence of events is insured by the action of plungers 229 and 244 with their ports as follows:

Assuming the parts in the position shown in Fig. 4, and that selector 172 is adjusted for a spindle speed requiring the engagement of clutch 51, the pattern of the ports 179 and grooves 180 is such that fluid, when admitted to the selector by valve 158, will be transmitted to pipes 235 and 257, Fig. 7, while pipes 243, 248, 255, and 256 will be connected to their exhaust ports 181. At this point the flow of fluid will be interrupted by the non-registration of ports 236 in cylinder 232 and 231 in plunger 229. Plunger 229 under the influence of pressure communicated through pipe 235 will move downwardly and in so doing will cause, through the angularity of its end portion 230 and recess 226, plunger 225 to move to the right and thus move, through arm 221 and fork 214, gear member 56 towards its neutral position. In the meantime, fluid in cylinder 228 will escape through pipe 234, port 250 in plunger 244, and pipe 256 to one of the exhaust ports 181. At the same time fluid will be drawn from reservoir 212 Fig. 10, through one of pipes 213, pipe 255, port 249, and pipe 233 into cylinder 227. It will be noted that at this time plunger 244 is in its uppermost position so that ports 249 and 250 are in registration with ports 251, 252, 253, and 254, respectively.

When, however, plunger 229 has reached the limit of its down stroke, as shown in Fig. 17, gear member 56 will have reached its neutral position and it will be permissible for clutch 51 to engage. At this time port 231 will register with ports 236 and 237 and thus allow fluid to flow from pipe 257 through the ports to pipe 242 and into cylinder 240. Plunger 239 will accordingly be forced to the right engaging the clutch through the fork 238. Fluid in cylinder 241 will escape to the exhaust through pipe 243. Plunger 244 is forced down by the motion of plunger 239, owing to the angularity of portion 246 and recess 247, while fluid in cylinder 245 escapes through pipe 248 to one of the exhaust ports. This movement throws ports 249 and 250 out of registration with ports 251, 252, and 253, 254, respectively, and prevents any flow of fluid in pipes 233 and 234, thus locking plunger 225 in its mid-position and gear member 56 in its neutral position at all times when clutch 51 is engaged. This locking action is in addition to that of plunger 229 acting in the recess 226 and persists even at times when there is no fluid pressure in cylinder 232.

Assuming now the plunger 225 in mid-position and plunger 239 in its right-hand position, gear member 56 in neutral and clutch 51 engaged, plunger 229 will be down and port 231 in registration with ports 236 and 237 and plunger 244 will be down and ports 249 and 250 out of registration with ports 251, 252, and 253, 254, respectively. As outlined above, it is important that clutch 51 be disengaged from gear 55 before gear member 56 is shifted from its neutral position.

Assuming also selector 172 adjusted for a spindle speed requiring the engagement of gears 58 and 59, fluid pressure will be admitted to pipes 243, 248, and 256 and pipes 242, 235, and 255 will be put into communication with exhaust ports 181.

At this point communication of pipe 256 with pipe 234 and of pipe 255 with pipe 233 is cut off by the non-registration of ports 249 and 250 with ports 251, 252, and 253, 254, respectively. It is accordingly impossible for plunger 225 to move from its mid-position or for gear member 56 to shift from neutral until plunger 244 has been permitted to rise through movement of plunger 239 and consequent disengagement of clutch 51.

However, fluid will pass through pipe 243 into cylinder 241 and move plunger 239 to the left, while fluid in cylinder 240 will pass through pipe 242, port 231 and pipe 257 to one of the exhaust ports 181. At the same time fluid will pass through pipe 248 into cylinder 245 and raise plunger 244 as plunger 239 moves. As soon as plunger 239 has moved sufficiently to disengage clutch 51, plunger 244 will have moved sufficiently to bring about registration of ports 249 and 250 with ports 251, 252, and 253, 254, respectively. Fluid will then flow through pipe 256, port 250 and pipe 234, forcing plunger 225 to the left and shifting gear 58 into mesh with gear 59. Fluid in cylinder 227 will in the meantime escape through pipe 233, port 249 and pipe 255 to one of exhaust ports 181. Such motion of plunger 225 will cause upward movement of plunger 229 and consequent non-registration of port 231 with ports 236 and 237. This negatives the possibility of fluid finding its way into cylinder 240 and causing engagement of clutch 51.

Selector sleeve 176 may be turned for obtaining the various adjustments by means of a clutch member 258, Figs. 5 and 6, slidably keyed on shaft 143 and having a conical friction face 259 for engaging clutch element 140, whereby to cause rotation of shaft 143 and sleeve 176. Shaft 143 extends outside of column 1 and dial 10 is fixed therewith so as to indicate at all times the position of sleeve 176.

Hand lever 9 is fixed on a shaft 260 journaled in column 1 and extending inside thereof and causes vertical movement of a rod 261 through pivotal connection with an arm 262 fixed on the inner end of shaft 260. Rod 261 moves clutch member 258 into and out of engagement with element 140 by means of a lever 263, Fig. 5, fixed with a shaft 264 journaled in suitable bearings in column 1. Lever 263 engages a pair of adjustable collars 265—265 on rod 261 for actuation thereby. A fork 266 is fixed with shaft 264 and engages a spool 267 formed on member 258 by means of pivoted shoes 268—268. Upward movement of lever 9 will accordingly cause engagement of clutch member 258 with element 140. Accordingly, when it is desired to change the adjustment of sleeve 176, it is merely necessary to raise lever 9 and watch dial 10 until the desired speed indication appears opposite pointer 11, when lever 9 may be lowered and clutch member 258 disengaged from element 140 and the motion stopped. The parts will be locked in their adjusted position by spring pressed plunger 182 engaging one of the recesses 183. The spring on plunger 182, however, is not powerful enough to interfere with the action of the clutch just described.

Rod 261 also operates valve 158 by means of a pin 269, Fig. 14, engaging a slot 270 in a lever 271 fixed with a shaft 272 journaled in a bracket 273 fixed with column 1. Shaft 272 carries a gear sector 274 fixed thereon and engaging a gear 275 fixed with the stem 276 of valve 158 projecting outside of casing 157. Movement of rod 261 up or down will accordingly cause rocking of lever 271 and sector 274 with consequent rotary movement of valve 158. The proportions of the valve 158, gear 275, sector 274 and lever 271 are such that valve 158 will provide communication between port 146 and pipe 159 at all times except when lever 9 is in its upper position and clutch member 258 is engaged with element 140.

Rod 261 actuates the main clutch 16 through rod 22 by means of a lever 277 engaging a spool 278 on shaft 22. Lever 277 is fixed with a shaft 279 rotatably supported from column 1 and having a lever 280, Figs. 1 and 6, fixed therewith. Lever 280 engages a pair of adjustable collars 281—281 adjacent the lower end of rod 261, whereby upward motion of rod 261 will cause movement of shaft 22 to the right in Figs. 1 and 4 and engagement of clutch 16, while downward movement of rod 261 will cause movement of shaft 22 to the left and disengagement of clutch 16.

The collars on rod 261 are so adjusted that clutch 258 is engaged when rod 261 is in its lowermost position, while valve 158 is closed and clutch 16 is disengaged, and when rod 261 is in an intermediate position, clutch 258 is disengaged, valve 158 is open, and clutch 16 is disengaged, and when rod 261 is in its uppermost position, clutch 258 is disengaged, valve 158 is open and clutch 16 is engaged.

These positions of rod 261 are the reverse of the positions of lever 9 owing to the action of arm 262, and accordingly raising lever 9 operates to cause rotation of the selector, while lowering it part way operates to cause shifting of the speed change elements into the position combinations which will produce the spindle speed indicated on dial 10, and moving it to its lowest position starts the spindle in operation. A spring pressed plunger 282, Fig. 6, slidably fitted in a part of column 1 cooperates with recesses 283 and 284, Fig. 1, in lever 9 to yieldably lock the same in its intermediate and lowermost positions. No provision is made for locking the lever in its upper position, since it is never desirable to maintain clutch 258 engaged for longer than necessary to adjust selector 172, and it gives the operator better control of the selecting action to have the lever freely movable during this operation.

It will be apparent that the ports 179 and grooves 180 can be arranged in any pattern desired and in practice they are so arranged that successive positions of adjustment of sleeve 176 will cause shifting of such speed change elements into such positions as will be productive of successive speeds in spindle 7. Dial 10 is accordingly calibrated to read directly in spindle revolutions per minute and the readings are consecutive from the lowest to the highest at which spindle 7 may be driven.

It may be noted that for various reasons it is important that the power for operation of the selective and shifter devices of the rate changer control shall not be interrupted during any operation of the machine. The power trains for these devices are therefore each driven from a point in the transmission which excludes the main clutch consisting of member 16 and associated parts and which also excludes the rate changer consisting of various shiftable elements since either the main clutch or the rate changer might otherwise act as motion interrupters.

For manual movement of table 4, a crank, not shown, may be applied to a squared portion 285 of table screw 90. Knee 2 may be raised and lowered by a suitable elevating screw 286, Fig. 1, engaging a threaded pedestal 287 and supporting the knee by means of a bearing 288. Screw 286 may be turned by a crank or the like, not shown, applied to the squared portion 289 of a shaft 290 journaled in knee 2 and driving screw 286 by means of bevel gears 291, 292, fixed with the shaft and screw, respectively, and saddle 3 may be moved horizontally on knee 2 by means of a screw 293 journaled in the knee and prevented from axially moving therein and engaging a nut portion 294 fixed with saddle 3. Screw 293 may be turned by a suitable crank, not shown, applied to squared portion 295 of screw 293.

The above being a complete description of an embodiment of the invention.

What is claimed is:

1. In a milling machine, the combination of a base, a tool spindle rotatably supported from said base, a work table supported from said base for movement in a direction transverse to the spindle axis, a power source driven at a substantially constant rate, a feed train driven from said source for relative bodily movement of said spindle and table, a spindle rotating train driven from said source, a main clutch operable for interrupting both said trains, said spindle train including a rate changer having a plurality of gear elements shiftable into various position combinations collectively giving rise to a fast speed, a relatively slow speed and a plurality of intermediate speeds of said spindle; and control mechanism for said spindle train including a shifter operable to move said shiftable elements into said various position combinations one at a time, a train driven from said power source exclusive of said main clutch and connectible to operate said shifter, a lever manually operable to control the connection of the last mentioned train with said shifter, and speed selective means associated with said shifter including a chart having numerical markings respectively corresponding to different of said spindle speeds and an indicator movable relative to said chart in accordance with the element positioning effect resulting from operation of said shifting means.

2. In a milling machine, the combination of a rotatable tool spindle, a work support adjacent said spindle and reciprocably movable in a path transverse to the spindle axis, a substantially constant speed power source, a spindle train driven from said source and including a rate changer providing a number of gear elements shiftable into various position combinations respectively effective for different spindle speeds, a feed train for said work support and including a rate changer adjustable for a variety of relatively slow feed rates of support movement, clutch means operable to simultaneously interrupt both said trains, a first train driven from said power source to exclude said clutch means and each of said rate changers and connectible for a relatively fast rate of support movement, a second train driven from said power source to exclude said clutch means and both said rate changers and control mechanism for said milling machine including a fluid operable gear shifter operable to shift the gear elements of said spindle train rate changer out of any of said position combinations into any other thereof, a pump driven from said second train and connectible to operate said gear shifter, selective valve means associated with said pump and shifter and adjustable to predetermine a position combination which will result from shifter operation and in advance thereof, and other valve means operable independently of the first mentioned valve means for connecting said pump to operate said shifter.

FRED A. PARSONS.